United States Patent [19]

Smith

[11] 4,172,535

[45] Oct. 30, 1979

[54] CONTROL APPARATUS FOR A PNEUMATICALLY-OPERATED HOPPER FEEDER

[75] Inventor: Kenneth C. Smith, Woodstock, Canada

[73] Assignee: Teledyne Canada Limited, Rexdale, Canada

[21] Appl. No.: 857,743

[22] Filed: Dec. 5, 1977

[30] Foreign Application Priority Data

Nov. 7, 1977 [GB] United Kingdom ............... 46276/77

[51] Int. Cl.² ........................ B67D 5/34; B65G 53/04; H01H 35/24; G01G 13/26
[52] U.S. Cl. ........................................ 222/58; 222/77; 406/23; 177/114; 200/81.9 R; 200/61.21; 141/268; 141/59
[58] Field of Search ....................... 222/56, 58, 53, 52, 222/77, 61; 302/3, 59; 177/114, DIG. 7; 141/59, 268, 267; 200/81.9 R, 61.2, 61.21

[56] References Cited

U.S. PATENT DOCUMENTS

| | | | |
|---|---|---|---|
| 3,186,768 | 6/1965 | Pendelton | 302/3 |
| 3,498,395 | 3/1970 | Henry | 222/56 X |
| 3,814,877 | 6/1974 | Alvarez | 200/81.9 R X |
| 4,118,612 | 10/1978 | Gabus | 200/81.9 R |

FOREIGN PATENT DOCUMENTS 1959015   5/1971   Fed. Rep. of Germany ............. 222/52

*Primary Examiner*—Joseph J. Rolla
*Assistant Examiner*—Edward M. Wacyra
*Attorney, Agent, or Firm*—Ridout & Maybee

[57] ABSTRACT

The operation of a vacuum-conveying hopper feeder is controlled using pneumatic logic circuitry including a leak sensor relay providing improved control accuracy and with a sensor orifice which becomes occluded by a spring-loaded plunger when the feeder body is filled to a predetermined weight. The leak sensor relay connects through a pneumatic logic NOT element to an aspirator or pump control valve and releases the vacuum allowing the contents of the body to be dumped. Time delay elements can be included between the relay, NOT element, and control valve so as to continue the filling for a predetermined interval following occlusion of the sensor orifice and to continue the dumping for a period following unblocking of the orifice.

18 Claims, 3 Drawing Figures

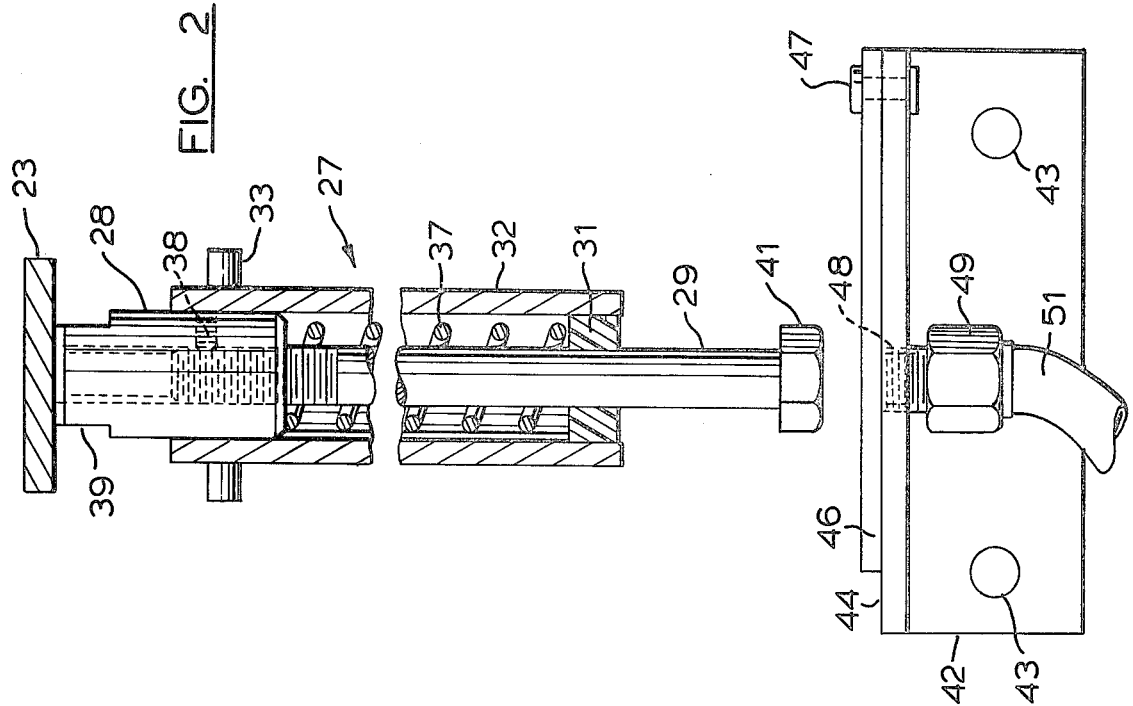
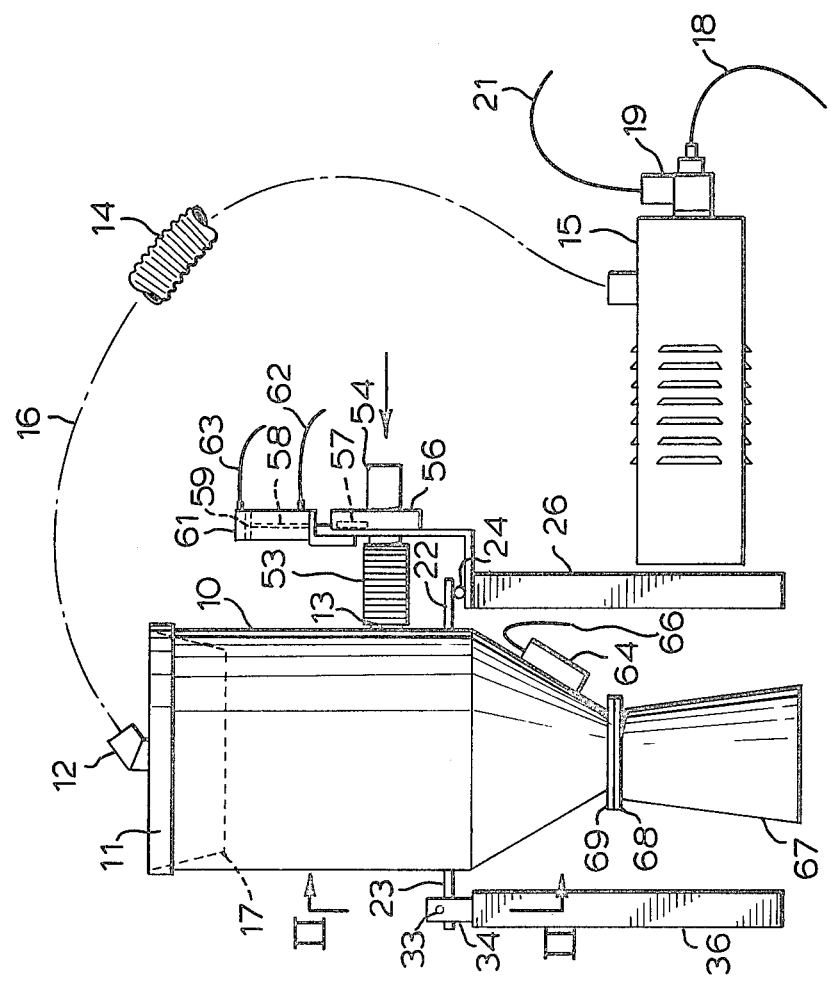

CONTROL APPARATUS FOR A PNEUMATICALLY-OPERATED HOPPER FEEDER

BACKGROUND OF THE INVENTION

The present invention relates to control apparatus for a pneumatically operated hopper feeder.

In many manufacturing and packaging processes, it is required to provide a supply of particulate material. One conventional supply system employs a pneumatically operated hopper feeder. In the usual form of apparatus, material is drawn, along with entraining air, into a hopper body to which a vacuum is applied. When a given weight of material has been filled into the hopper body, the body which is supported on a resilient suspension, becomes displaced downwards sufficiently to actuate a normally closed pilot valve. On actuation, this valve causes the vacuum on the body to be released and the filling operation stops. The release of vacuum allows a one-way valve on the bottom of the body to open, and the body dumps its contents and is raised upwards by the suspension. The normally closed pilot valve is deactuated and vacuum is re-applied to the body. The cycle can then repeat itself.

An example of the above-described apparatus is illustrated in U.S. Pat. No. 3,186,768, in the name F. P. Pendelton, dated June 1, 1965.

SUMMARY OF THE INVENTION

The present inventor has observed that the form of pilot valve having a sliding valve stem that is used in the conventional apparatus does not always give reliable results, as under continued use of the apparatus, there tends to be variation of the operating force that is required to actuate the pilot valve and so there tends to be variation in the weight of material in the hopper that is dispensed in each cycle of operation. Moreover, when used for feeding low-density lightweight material, when the control apparatus has to be adjusted so that it is actuated by only a small weight of material, the prior apparatus tends to stick with the pilot valve in the open position and vacuum cut off.

In the apparatus of the present invention, there is employed pneumatic logic apparatus connected to an air source and supplying a leakage of air to a control orifice which normally vents to the atmosphere and becomes occluded on downward movement of a plunger associated with the hopper body so as to allow release of the vacuum applied to the hopper body, leading to dumping of the body contents.

With this arrangement, a reliable and repeatable functioning of the control apparatus may be achievable at predetermined loadings, including small loadings, of the hopper body.

A conventional leak sensor relay may be employed as the pneumatic logic apparatus. Commercially available leak sensor relays can be actuated by pressures as small as two-thirds pound weight applied to the control orifice and with the arrangement above-described, by adjusting the resilient characteristics of the resilient suspension, it may be possible to adjust the control apparatus so that it can be made to respond to contained weights of materials ranging from powders as light as Cab-O-Sil having a density of two and one-half pounds per cubic foot up to dense metal powders having densities of the order of two hundred pounds per cubic foot.

In the preferred form, the control apparatus is arranged so that there is a delay between occlusion of the control orifice and release of vacuum, so as to tend to fill more material into the hopper body during the filling part of the operating cycle, and also so that the risk can be avoided of the apparatus operating in a condition in which the hopper body is caused to violently bounce up and down in a state of driven oscillation. Further, it is preferred to arrange for a delay between unblocking of the control orifice and re-application of vacuum to the hopper body. This causes the hopper body to completely empty itself of particles during the dumping part of the cycle before vacuum is re-applied and reduces the risk of particles becoming trapped in the one-way valve at the bottom of the hopper body which would result in impairment of the seal in the one-way valve, and reduce the efficiency of the operation.

The preferred form of control apparatus comprises a pneumatic leak sensor relay connected to an air source and to a control orifice adapted to be occluded on predetermined displacement of the hopper body, a pneumatic logic NOT element connected to the source and to the output of the relay through a pneumatic delaying element, and the output of the NOT element being connected through a pneumatic delaying element to an air-actuated control device for permitting vacuum release. Advantageously, each of the said elements are self-venting when a positive pneumatic control signal is not applied to them, so as to allow dissipation of unwanted residues of pneumatic control signals.

BRIEF DESCRIPTION OF THE DRAWINGS

An example of a preferred embodiment of the invention is illustrated in the accompanying drawings in which:

FIG. 1 shows a simplified view from the side of a hopper feeder apparatus;

FIG. 2 shows an enlarged view partly in section on the line II—II of FIG. 1, showing a control element of the apparatus;

DESCRIPTION OF THE PREFERRED EMBODIMENT

Figure 3:
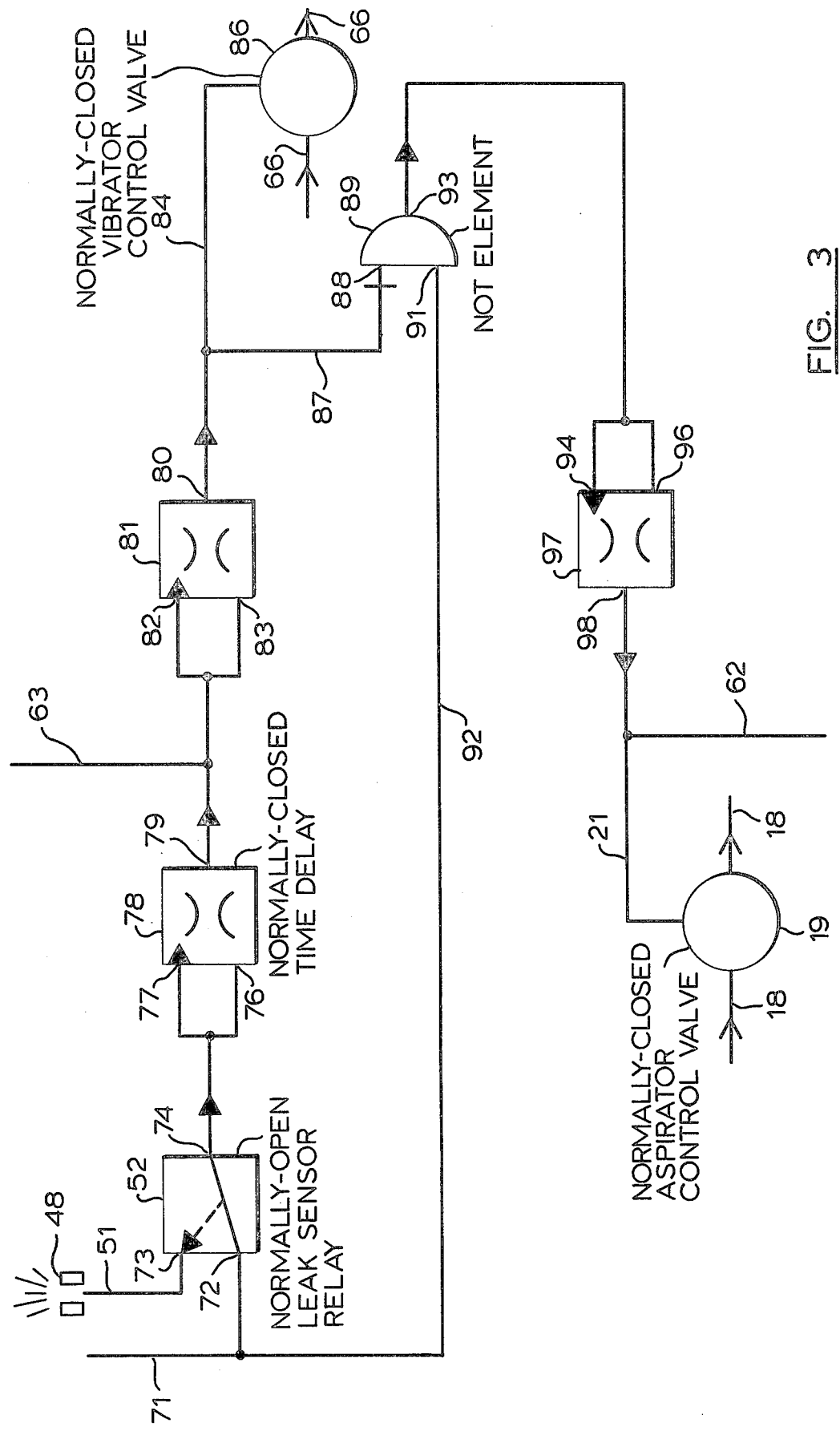
FIG. 3 is a block diagrammatic representation of the control apparatus for the hopper feeder of FIG. 1.

Referring to the drawings, FIG. 1 shows a hopper body 10 provided with an air tight lid 11 and with an air exhaust outlet 12 and an inlet 13 in its side for entry of powdered, granular or other particulate material.

A flexible hose 14 connects the air exhaust outlet 12 to a jet pump or aspirator 15 as indicated by broken line 16. In the hopper body 10 is a filter, indicated by broken line 17, retained at its edges between the rim of the hopper body 10 and the lid 11.

Aspirator 15 is supplied with compressed air along a line 18. The supply of compressed air is controlled by a normally closed control valve 19 which is actuatable by supply of air on a line 21.

Two lugs 22 and 23 are integrally connected on opposite sides of the hopper body. The lug 22 rests on a roller 24 which acts as a fulcrum about which the hopper body pivots. The roller body 24 rests on a box-like support panel 26 which is seen from the side in FIG. 1.

At the opposite side, the lug 23 rests on a spring-loaded vertically-reciprocable control element 27 shown in more detail in FIG. 2. The lug 23 bears on the upper end of a nut member 28 into which is threaded a bolt 29. The bolt passes through and is guided within a nylon or other low-friction bushing 31 fixed within a support tube 32. Pins 33 are connected on the outer sides of the upper end of the support tube 32. The pins 33 are used to mount the support tube 32 on an upward extension 34 of a support panel 36 on the said side of the hopper body, as shown in FIG. 1.

A compression spring 37 acts between the bushing 31 and the lower surface of the nut member 28 and urges the latter upwardly. The position of the bolt 29 at any given loading of the hopper body 10 can be adjusted by screwing the bolt 29 into or out of the threaded nut member 28. Once adjusted, the position can be set by tightening a locking set screw 38 which is threaded radially into the nut member. The nut member 28 is provided with flats 39 at its upper end so that it can be gripped to facilitate rotation of the bolt 29 relative to the nut member 28.

Below the head 41 of the bolt 29, an angle bracket 42 is mounted on the support panel 36 through connectors 43. The horizontal section 44 of the bracket 42 forms a platform on which lies a flap 46 of rubber or similar flexible gasket-like material. One end of the flap 46 is connected to the horizontal platform section 44 by a rivet 47.

A threaded hole 48, which forms a control orifice, is formed through the platform section 44, and into this is inserted a threaded connector 49 to which is joined an air supply line 51 through which is supplied an air leakage from a leak sensor relay 52, as shown in FIG. 3.

Referring once more to FIG. 1, the particulate material inlet 13 connects through a flexible hose 53 to an inlet section 54 equipped with a gate valve housing 56. Within the housing 56 there is mounted a sliding gate valve member 57 which is reciprocable between a closed position obstructing passage of material through the pipe section 54 and an open position, indicated in broken lines in FIG. 1. The gate valve member 57 is shifted between these two positions by a piston rod 58 connected to a piston 59 working within a pneumatic cylinder 61 supplied with air through lines 62 and 63.

The side of the lower part of the hopper body 10 is equipped with an air-operated vibrator device 64 which vibrates the hopper body and its contents when supplied with air along line 66.

At the bottom of the hopper body, the body is formed with a discharge opening, on which is attached a one-way valve 67. In the example illustrated, this is a flared skirt of rubber or like flexible material attached by connecting rings 68 and 69 about the discharge opening of the hopper body.

Referring to FIG. 3, the pneumatic control apparatus includes an air supply line 71, along which air is continuously supplied from a source of compressed air. The leak sensor relay 52 has its supply orifice 72 connected to the supply 71 and supplies a small leakage flow of air to its sensor orifice 73, to which is connected the line 51 supplying the leakage flow to the control orifice 48. The leak sensor relay is of the normally open type, and may be, for example, a CROUZET leak sensor relay of the normally open type, Ser. No. 81.502.430 available from Miller Fluid Power (Canada) Limited, Mississauga, Ontario.

The operating principle of the leak sensor relay 52 is that when the control orifice 48 is occluded and there is no leakage of air through the line 51, the relay is de-actuated and open and allows flow of air from the supply orifice 72 to an output orifice 74. When the control orifice 48 is unblocked, and a leakage of air along line 51 is sensed by the relay, the relay is actuated and closes and prevents flow of air from the supply orifice 72 to the output orifice 74.

The output orifice 74 of the leak sensor relay is connected to the supply orifice 76 and to the input orifice 77 of a normally closed time delay element 78. The time delay element 78 may, for example, be a normally closed time delay element such as the MAXAM timer Ser. No. 70PITUB1010 available from Compair Canada Limited, Mississauga, Ontario. The principle of operation of element 78 is that normally no flow is permitted between supply orifice 76 and an output orifice 79. When air is supplied to input orifice 77 connection is established between orifices 76 and 79 after a predetermined delay, which for the purposes of the present example is of the order of two or three seconds. The output orifice 79 from the time delay element 78 is connected to the air supply line 63 for the pneumatic cylinder 61 and to a second time delay element 81, similar to the time delay element 78, having input and supply orifices 82 and 83 connected to the time delay element 78, and also giving a fixed delay of two or three seconds. The output orifice 80 from the time delay element 81 has two connections. Firstly, there is a connection along a line 84 to a normally closed air-actuated control valve 86 of the conventional type which controls supply of compressed air from the source through the line 66 which feeds air to the vibrator device 64. Secondly, the element 81 is connected through a line 87 to the input orifice 88 of a pneumatic NOT element 89. The NOT element has a supply orifice 91 which is connected to the compressed air source through a line 92 connected to the supply line 71. The NOT element also has an output orifice 93. The NOT element may be, for example, a MAXAM NOT logic element Ser. No. 70PNOT0020 available from Compair Canada Limited. The operating principle of the NOT element 89 is that when air is not supplied to input orifice 88, the NOT element allows flow of air from the source through supply orifice 91 to the output orifice 93. When air is supplied to the input orifice 88, the NOT element closes and prevents passage of air from the supply orifice 91 to the output orifice 93.

The output orifice 93 of the NOT element connects to the input and supply orifices 94 and 96 of a third time delay element 97 similar to elements 78 and 81 and also giving a delay of two or three seconds. The output orifice 98 from the timer 97 has two connections, the first of which is to the supply line 62 to the pneumatic cylinder 61, and the second of which is to the line 21 which supplies air to a conventional form of normally closed air-actuated aspirator control valve 19, which controls the supply of compressed air on the line 18 which feeds compressed air to the aspirator 15.

In operation, the inlet section 54 of the hopper feeder is connected through a flexible hose (not shown) to a bin or other storage of particulate material that is to be fed. Compressed air is supplied along the supply line 18 feeding the aspirator 15, along the line 66, feeding the vibrator device, and along the line 71 that is connected to the leak sensor relay 52 and to the NOT element 89.

The position of the bolt 29 is adjusted relative to the nut member 28 so that under the compression of the spring 37 that results when an appropriate amount of particulate material has filled into the body 10, the bolt 29 will occupy a depressed condition applying sufficient pressure to the flap 46 to cause occlusion of the control orifice 48. Where necessary, a compression spring of stronger or weaker characteristics may be substituted within the control element 27 so as to give the occlusion effect at the required level of filling of the hopper body 10.

Initially, however, when the hopper body 10 is empty, the action of the compression spring 37 urges the hopper body, together with the lug 23, the nut member 28 and the bolt 29 upwardly, to the position as shown in FIG. 2 where the head of the bolt 41 is clear of the rubber flap 46. In this condition, air supplied on the leakage line 51 can leak out through the control orifice 48, the rubber flap 46 being deflected upwardly slightly under the upward pressure of air so as to permit the leakage. The leak sensor relay is accordingly in its actuated, or closed condition in which there is no flow of air permitted between the supply orifice 72 and the output orifice 74 and the apparatus is in the filling part of the cycle. Accordingly, there is no pressure of air on the line 87 leading to the NOT element which thus remains in an open condition, permitting flow of air from its supply orifice 91 to its output orifice 93 and through the time delay element 97 to the normally closed aspirator control valve 19, which under the applied pressure of air is in an actuated or open condition, allowing flow of air from the source through the line 18 to the aspirator 15. At the aspirator 15, air is drawn through the air exhaust hose 14 from the air exhaust outlet 12 at the top of the hopper body, creating a partial vacuum in the hopper body 10. Air is drawn in through the inlet 13 and through the inlet section 54. The inrush of air entrains with it particulate material from the storage, so that the suspended and entrained particles are drawn into the hopper body 10. The air is separated from the particles at the filter 17, and the particles drop into the hopper body and collect in its lower region.

Because of the partial vacuum within the hopper body, the walls of the flexible skirt of the one-way valve 67 collapse inwardly on themselves and thus seal the bottom of the hopper body against discharge of material.

In the filling part of the cycle, air is supplied on the line 62 to the pneumatic cylinder 61, maintaining the gate valve member 57 in a raised position, allowing free passage of material through the inlet section 54.

As the particulate material continues to collect in the hopper body, the weight of the collected material causes the hopper body to tilt downwardly about the pivot roller 24, compressing the spring 37 until, at a predetermined loading of the hopper body, the head 41 of the bolt 29 compresses against the rubber flap 46 with sufficient force to occlude the control orifice 48 and de-actuate the leak sensor delay 52. This therefore reverts to its open condition and initiates an air flow to the input and supply orifices 77 and 76 of the time delay element 78 and after the timed delay, supply orifice 76 connects to output orifice 79. After further delay at time delay element 81, the commencement of air flow, from the output orifice 80 of the second time delay element 81 is thus delayed by an interval of some 4 to 6 seconds following the de-actuation of the relay 52.

The NOT element 89 thereupon becomes closed under the influence of the air pressure supplied on the line 87, so that the air supply on the line 21 to the normally closed aspirator control valve 19 is interrupted, thus stopping the aspirator 15. Air then begins to leak through the aspirator 15 from the atmosphere and through the exhaust hose 14 to the interior of the hopper body through the exhaust outlet 12. As the vacuum is released, the flexible skirt of one-way valve 67 is opened under the weight of the particulate material collected in the hopper body, so that the latter flows out through the discharge opening.

Once the material has begun to flow out from the hopper body, the upward pressure of the spring 37 causes the bolt 29 to lift upwardly until a position is reached at which a leakage of air is permitted from the control orifice 48 sufficient to actuate the relay 52 to its closed condition, and once more interrupt supply of air to the output orifice 74 of the relay 52. The supply of air to the input orifice 88 of the NOT element 89 is therefore interrupted, and this changes state, providing a supply of air from the input and supply orifices 94 and 96 of the time delay element 97. After a predetermined interval, typically of two to three seconds, as determined by the time delay element 98, connection is made between the supply orifice 96 and the output orifice 98 of the element 97 so that it is supplied to the normally closed aspirator control valve 19 through the line 21, so that the valve 19 is opened, and the aspirator 15 is re-started. Vacuum is once more re-applied on the hopper body 10, and the flexible skirt of the one-way valve 67 closes, and particulate material is once more fed into the hopper body through the inlet 13, and the filling part of the operating cycle of the apparatus then recommences.

By delaying the disconnection of the aspirator for a predetermined interval following the de-actuation of the leak sensor relay 52, at the commencement of the material-dumping part of the cycle, the apparatus reduces the risk of there occurring a condition in which the hopper reciprocates violently up and down through rapidly alternating release and application of the vacuum to the hopper body. In some circumstances, it is possible for the application of vacuum to the flexible hose 14 to cause a tension in the hose 14 and this exerts a downward pull on the hopper body 10. In the absence of a delay between the occlusion of the leak sensor orifice 48 and the disconnection of the aspirator, this may cause a driven oscillation in which the hopper body bounces violently up and down on the compression spring 37, with the bolt 29 hammering on the rubber pad 46 which is supported on the platform 44. The delay can interfere with this cycle of oscillation and will reduce the risk of a driven oscillation cycle arising. The leak sensor relay 52 and the time delay and NOT elements 78, 81, 89, and 97 are all self-venting and their output orifices 74, 79, 80, 93, and 98 vent to the atmosphere when they are not connected to their respective supply orifices 72, 76, 83, 91 and 96. Thus, unwanted residues of pneumatic control signals are rapidly dissipated and in particular if there is a momentary pressure impulse fed to the time delay element 81 this will tend to dissipate unless the pressure signal continues to be applied for more than the period of the predetermined delay.

As the aspirator continues to run for an interval of time after the control orifice has been occluded, particulate material continues to be filled into the hopper body 10 for this interval, and therefore a larger amount of particulate material will be collected in the hopper body prior to the opening of the one-way valve 67, so that a somewhat larger quantity of material is discharged from the hopper in each cycle of operation than would otherwise be the case.

As there is another delay at the commencement of the filling part of the cycle interval, as determined by the time delay element 97, between the unblocking of the control orifice 48 on upward movement of the bolt 29 and the actuation and re-opening of the normally closed aspirator control valve 19, the one-way discharge valve 67 does not close until the termination of this interval and this can allow the particulate material to completely empty from the hopper body before the valve 67 closes, so that the risk of particulate material being trapped in the valve 67 can be avoided. Trapping of material in the valve would tend to result in a leakage of air into the hopper body as a result of the seal of the valve 67 being impaired, and this would reduce the efficiency of the vacuum conveying operation.

In the embodiment shown, it will be noted that the normally closed vibrator control valve 86 is actuated when the NOT element 89 is closed, so that the vibrator device 64 runs when the one-way valve 67 at the bottom of the hopper body opens so as to vibrate the particulate material collected inside the hopper and facilitates its outflow through the discharge opening. When the control orifice 48 becomes unblocked the valve 86 closes, the vibrator device stops and after the interval timed by element 97, the aspirator 15 re-starts and the one-way valve 67 closes. Other conventional accessories, e.g. a device for shaking the filter 17, that are to be operated during the dumping part of the cycle, may be connected through the line 84.

With the embodiment, as shown in the drawings, after two or three seconds, as determined by the time delay element 78, following the occlusion of the control orifice 48, air is passed along line 63 to the pneumatic cylinder 61 and the gate valve member 57 closes the inlet section 54. The air is not, however, supplied to the NOT element for a short interval, as determined by the time delay element 81, after the closure movement of the gate valve member 57, and so air continues to be supplied along line 21 to the normally closed aspirator control valve 19 for this interval of time, and the aspirator continues to run for this interval. As the inlet section 54 is sealed by the gate valve member 57, the continued running of the aspirator 15 results in a greater partial vacuum within the hopper body 10. As a result, when the normally closed aspirator control valve 19 finally closes and the aspirator stops, there is greater impetus to the inrush of air leaking in through the aspirator 15 and through the supply hose 14 to the inlet 12. This greater pressure of atmospheric air acting on the filter 17 gives an augmented back-washing effect, tending to more efficiently clear the filter 17 of any accumulated particulate material that may be adhering to it.

On re-actuation of the NOT element 89 following unblocking of the control orifice 48, air is passed to the line 62 at the same time as air is passed to the normally closed aspirator control valve 19, so that the pneumatic cylinder 61 is actuated and the gate valve member 57 is lifted, allowing free flow of particulate material in through the inlet section 54 and the inlet 13 when the aspirator recommences its operation.

In a typical application of the above-described hopper feeder, the apparatus may be employed to supply material into a surge hopper located immediately below the hopper body 10. The surge hopper may feed processing or packaging machinery and may have its upper rim above the level of the lower end of the rubber skirt forming the one way valve 67 at the bottom of the hopper body. In use, the hopper feeder above-described will continue to run in its cycle of operation as long as the level of particulate material in the surge hopper remains below the level of the one-way valve 67. Once the surge hopper is filled, material will not be able to empty from the hopper body 10, and under the weight of material remaining within the hopper body 10, the apparatus will remain in the dumping part of the cycle in a condition in which the hopper body is tilted downwardly and the bolt 29 causes the control orifice 48 to be occluded. The apparatus will remain in this condition until sufficient material is emptied from the surge hopper for the hopper body 10 to once more tilt upwardly under the action of the upward pressure of the compression spring 37 and the filling of the hopper body 10 recommences.

It will be appreciated that various modifications may be made to the apparatus as described in detail above. For example, a normally closed leak sensor relay may be employed instead of the normally open leak sensor relay 52. With this arrangement, when the control orifice 48 is occluded no air is supplied to the output orifice 74 and it is then the time delay elements 78 and 81 instead of the time delay element 97 that delays re-actuation of the aspirator 15 at the start of the filling part of the cycle and the time delay element 97 will then delay the stopping of the aspirator 15 following occlusion of the control orifice 48 at the start of dumping part of the cycle.

In place of the aspirator 15, a continuously running vacuum pump may be employed and it is then necessary to replace the normally closed aspirator control valve by an air-operated three-way valve that can be switched between positions connecting the exhaust hose 14 selectively to the atmosphere and to the vacuum pump.

I claim:

1. Hopper feed apparatus comprising: a hopper body having an inlet and an outlet at the bottom equipped with an outlet valve; means for applying vacuum to the hopper body and being operable in a filling part of an operating cycle wherein vacuum is applied to the hopper body and being deactivated in a dumping part of said cycle wherein the vacuum applied to the body is released; an air-actuated control device controlling the operation of said vacuum-applying means and being switchable between conditions operating said means in the filling and dumping parts of said cycle, respectively; resilient suspension means supporting the hopper body; a plunger associated with the hopper body and moving downward when the suspension means is displaced downward under the weight of material filled into the body; a pneumatic logic leak sensor relay having a supply orifice connected to an air source, a sensor orifice supplying an air leakage to a control orifice arranged to be occluded on predetermined downward movement of the plunger, and an output orifice; and a pneumatic logic NOT element having a supply orifice connected to said source, an input orifice operatively connected to the output orifice of the leak sensor relay and an output orifice operatively connected to said air-actuated control device; said relay changing state on occlusion of and on unblocking of its control orifice, and actuating said NOT element and switching said control device, whereby the operation of the vacuum-applying means can be switched between the filling and the dumping parts of said operating cycle.

2. Apparatus as claimed in claim 1 including at least one pneumatic time delay element connected between the leak sensor relay and the control device and in series with the NOT element, said delay element delaying passage of a positive air flow through itself for a predetermined period of time.

3. Apparatus as claimed in claim 1 comprising a first time delay element between the relay and the NOT element and a second time delay element between the NOT element and the control device, each said delay element delaying passage of a positive air flow through itself for a respective predetermined period of time, whereby one of said delay elements delays switching of said vacuum-applying means to the dumping part of the operating cycle following occlusion of the control orifice and the other of said delay elements delays switching of said vacuum-applying means to the filling part of the cycle following unblocking of the control orifice.

4. Apparatus as claimed in claim 3 wherein said relay is a normally-open leak sensor relay and initiates a positive air flow to said NOT element on occlusion of the control orifice, and said control device switches from its dumping condition to its filling condition on application of positive air pressure thereto, whereby said first time delay element delays switching from the filling part to the dumping part of the operating cycle and the second time delay element delays switching from the dumping part to the filling part of the operating cycle.

5. Apparatus as claimed in claim 3 including air-pressure responsive means for responding to a positive air flow supplied to said one time delay element prior to the vacuum-applying means switching to the dumping part of the cycle, and closing a valve connected to the hopper body inlet and for opening said valve on switching from the dumping part to the filling part of the cycle.

6. Apparatus as claimed in claim 5 wherein the pressure-responsive means comprise a pneumatic cylinder having a working piston actuating a valve member, the cylinder having connections to an input orifice of said one time delay element and to an output orifice of said other time delay element.

7. Apparatus as claimed in claim 5 including a further time delay element connected to the input of said one time delay element, said responsive means having a connection to the output of the further time delay element, whereby the responsive means are actuated following a predetermined period of occlusion of the control orifice.

8. Apparatus as claimed in claim 3 including an auxiliary air-actuated device connected to an output orifice of said one time delay element, whereby the auxiliary device is actuated when the vacuum applying means switches to the dumping part of the operating cycle.

9. Apparatus as claimed in claim 8 wherein the auxiliary device is a control device for operating a vibrator attached to the hopper body.

10. Apparatus as claimed in claim 1 wherein the control orifice is overlaid with a flexible flap which is normally displaced upwardly by the air leakage from the orifice, and is pressed down into sealing relationship with the orifice on downward movement of the plunger.

11. Apparatus as claimed in claim 1 wherein the plunger acts upwardly on the hopper body and the resilient suspension includes resilient means urging the plunger upwardly.

12. Apparatus as claimed in claim 11 including adjustable means between the hopper body and the resilient means for adjusting the normal position of the plunger relative to the control orifice.

13. Hopper feeder apparatus comprising: a hopper body having an inlet and an outlet at the bottom equipped with a one-way valve; resilient suspension means supporting the hopper body; pneumatic conveying means for filling particulate material into the hopper body; and pneumatic sensing apparatus for sensing a pre-determined downward movement of the hopper body following a predetermined weight of material being filled into the body, said sensing apparatus comprising: a pneumatic logic element having a supply orifice connected to a compressed air source, a sensor orifice connected to control orifice means, and an output orifice; a plunger associated with the hopper body and being adapted to occlude the control orifice means on predetermined downward movement of the hopper body; said logic element including a connection between its supply orifice and its sensor orifice whereby a small leakage of air is supplied to the control orifice means, and said element responding to unblocking of said control orifice means and changing from a normal state to an actuated state, said element initiating a supply of air from the supply orifice to the output orifice when in one of said states, whereby a change in the air pressure supplied from said output orifice indicates occlusion of the control orifice means.

14. Apparatus as claimed in claim 13 wherein said element is a normally open leak sensor relay and shuts off the supply of air to the output orifice when the control orifice means is unblocked and a leak therefrom is sensed.

15. Apparatus as claimed in claim 13 wherein the control orifice is overlaid with a flexible flap which is normally displaced upwardly by the air leakage from the orifice, and is pressed down into sealing relationship with the orifice on downward movement of the plunger.

16. Apparatus as claimed in claim 13 wherein the plunger acts upwardly on the hopper body and the resilient suspension includes resilient means urging the plunger upwardly.

17. Apparatus as claimed in claim 16 including adjustable means between the hopper body and the resilient means for adjusting the normal position of the plunger relative to the control orifice.

18. Apparatus as claimed in claim 17 wherein the adjustable means comprise a nut member adjustably screw-threaded on the plunger and bearing upwardly on the hopper body, the resilient means acting upwardly on the nut member.

* * * * *